US012091335B2

(12) United States Patent
Ben Salah et al.

(10) Patent No.: US 12,091,335 B2
(45) Date of Patent: *Sep. 17, 2024

(54) ELECTROLYTIC REACTOR AND METHODS FOR THE ELECTROLYTIC TREATMENT OF FLUIDS

(71) Applicant: E2METRIX, INC., Sherbrooke (CA)

(72) Inventors: Ihsen Ben Salah, Sherbrooke (CA); Mohamed Laaroussi, Sherbrooke (CA)

(73) Assignee: E2METRIX INC., Sherbrooke (CA)

( * ) Notice: Subject to any disclaimer, the term of this patent is extended or adjusted under 35 U.S.C. 154(b) by 125 days.

This patent is subject to a terminal disclaimer.

(21) Appl. No.: 17/692,940

(22) Filed: Mar. 11, 2022

(65) Prior Publication Data

US 2022/0289599 A1 Sep. 15, 2022

Related U.S. Application Data

(60) Provisional application No. 63/160,390, filed on Mar. 12, 2021.

(51) Int. Cl.
*C02F 1/467* (2023.01)
*C02F 1/461* (2023.01)
*C02F 1/463* (2023.01)

(52) U.S. Cl.
CPC ........ *C02F 1/4672* (2013.01); *C02F 1/46109* (2013.01); *C02F 1/463* (2013.01);
(Continued)

(58) Field of Classification Search
CPC ................ C02F 1/4672; C02F 1/46109; C02F 2201/4611; C02F 2201/46105; C02F 2201/46145; C02F 2201/006; C02F 1/463
See application file for complete search history.

(56) References Cited

U.S. PATENT DOCUMENTS 1,194,000 A * 8/1916 Dobyns ..................... C02F 9/00
205/756
3,756,932 A * 9/1973 Novotny ................. C02F 1/048
205/742
(Continued)

FOREIGN PATENT DOCUMENTS

WO 2014/047726 A1 4/2014
WO 2017/070798 A1 5/2017
WO 2021/151195 A1 8/2021

OTHER PUBLICATIONS

International Search Report dated Apr. 22, 2022 from corresponding PCT/CA2022/050365.

*Primary Examiner* — Alexander W Keeling
*Assistant Examiner* — Alexander R. Parent
(74) *Attorney, Agent, or Firm* — Damien Calvet; Gowling WLG (Canada) LLP

(57) ABSTRACT

An electrolytic reactor for the electrolytic treatment of a fluid is disclosed. The reactor comprises an electrolytic chamber, an electrode cartridge comprising an electrode assembly longitudinally extending from a crown section configured to operatively seal the electrolytic chamber when the electrode assembly is inserted in the electrolytic chamber; an inlet extending perpendicularly to a vertical longitudinal axis defined by the electrolytic chamber; and an outlet extending through the crown section along the vertical longitudinal axis defined by the electrolytic chamber, the outlet being configured to be in fluid communication with the electrolytic chamber when the electrolytic chamber is sealed by the crown section. Advantageouslly, by having the outlet extending upwardly above the electrodes, any dead zone typically found on electrodes at the level of the outlet are eliminated, increaing as such the useful surface area of the electrodes spanning the entire length of the electrolytic chamber.

20 Claims, 12 Drawing Sheets

(52) U.S. Cl.
CPC .............. *C02F 2201/006* (2013.01); *C02F 2201/46105* (2013.01); *C02F 2201/4611* (2013.01); *C02F 2201/46145* (2013.01); *C02F 2303/04* (2013.01)

(56) References Cited

U.S. PATENT DOCUMENTS

| | | | | |
|---|---|---|---|---|
| 5,364,512 | A * | 11/1994 | Earl | C02F 1/4606 210/138 |
| 8,460,520 | B2 * | 6/2013 | Rigby | C02F 1/4602 205/687 |
| 10,882,766 | B2 * | 1/2021 | Taylor | C02F 1/4676 |
| 10,968,120 | B2 * | 4/2021 | Ben Salah | C02F 1/467 |
| 11,214,502 | B2 * | 1/2022 | Lutz | C25B 1/13 |
| 2009/0127194 | A1 * | 5/2009 | Joo | C02F 1/4672 210/638 |
| 2014/0027271 | A1 * | 1/2014 | Berrak | C02F 1/46109 204/225 |
| 2015/0211131 | A1 * | 7/2015 | Jacobs | C25B 1/04 204/239 |

* cited by examiner

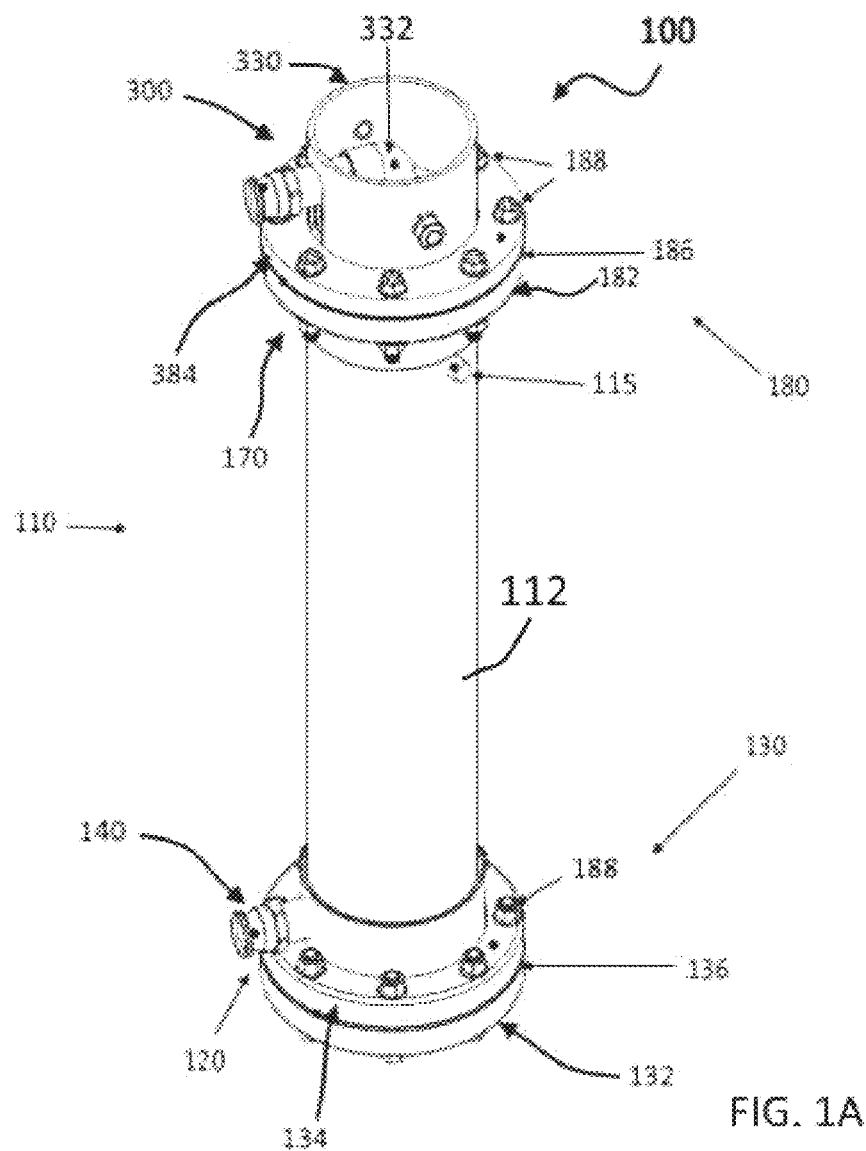
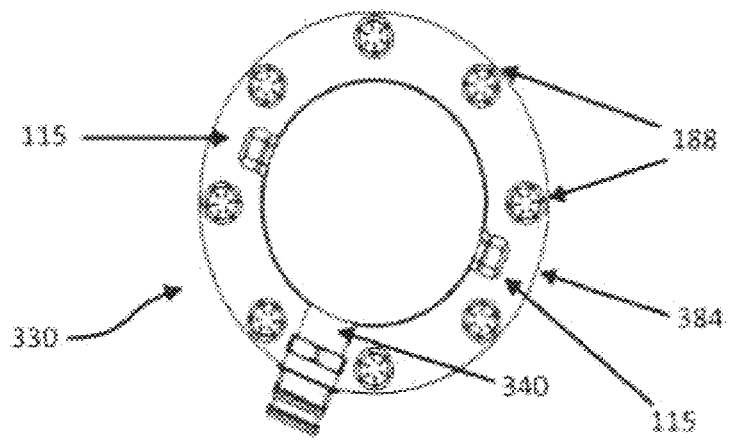
FIG. 1A
FIG. 1B

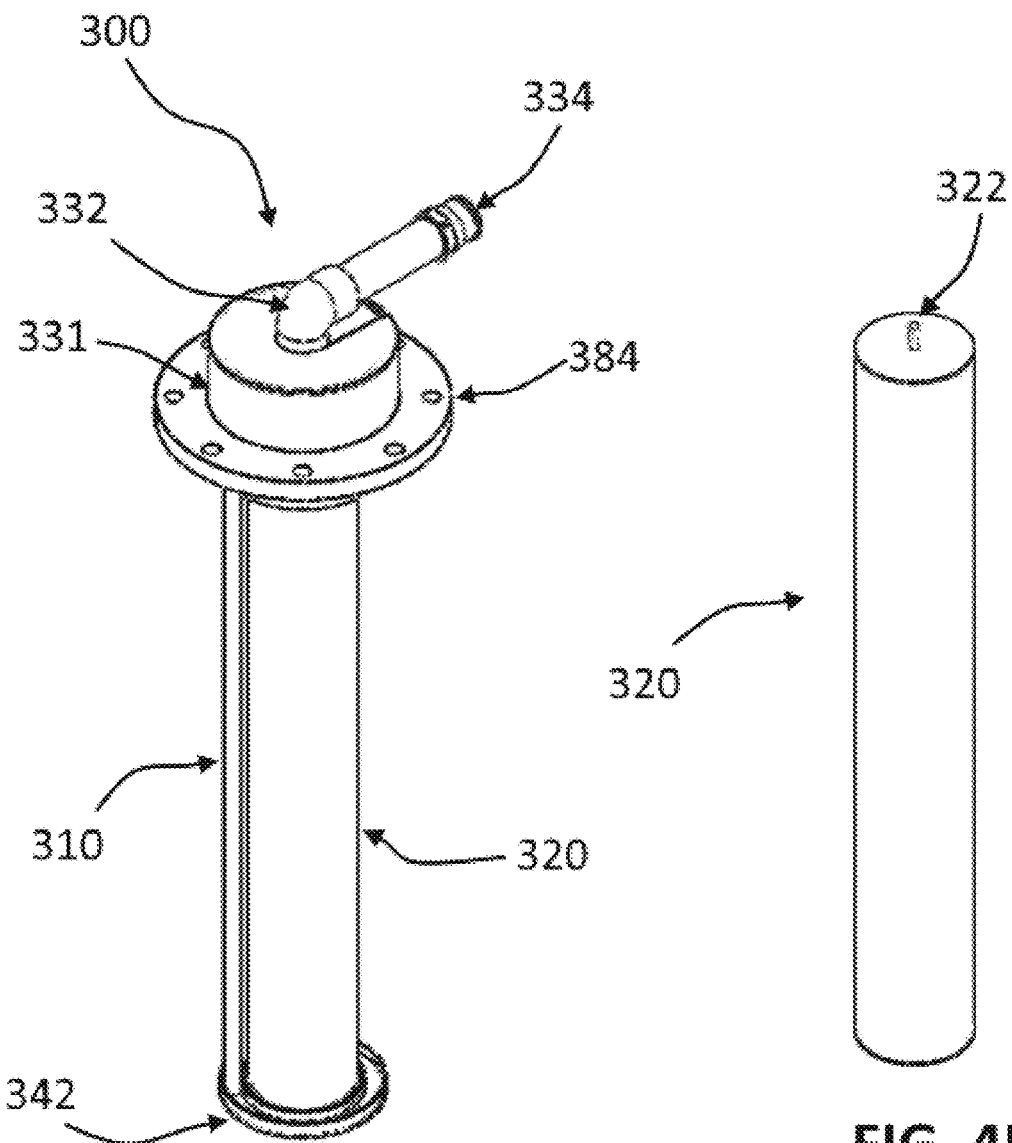
FIG. 4A
FIG. 4B
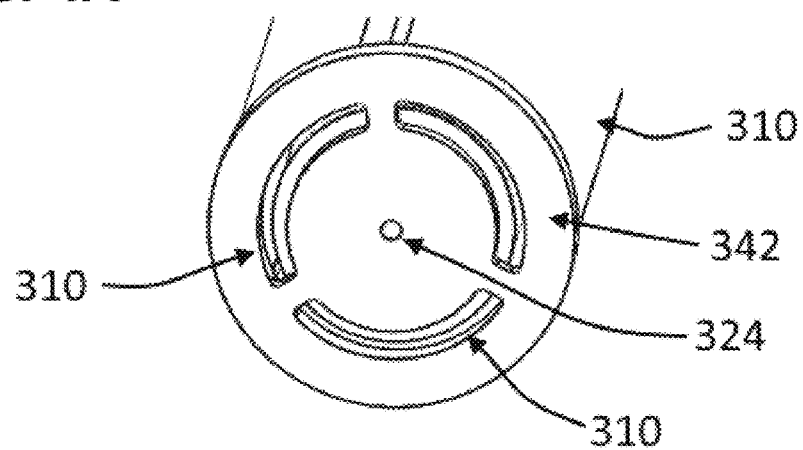
FIG. 4C

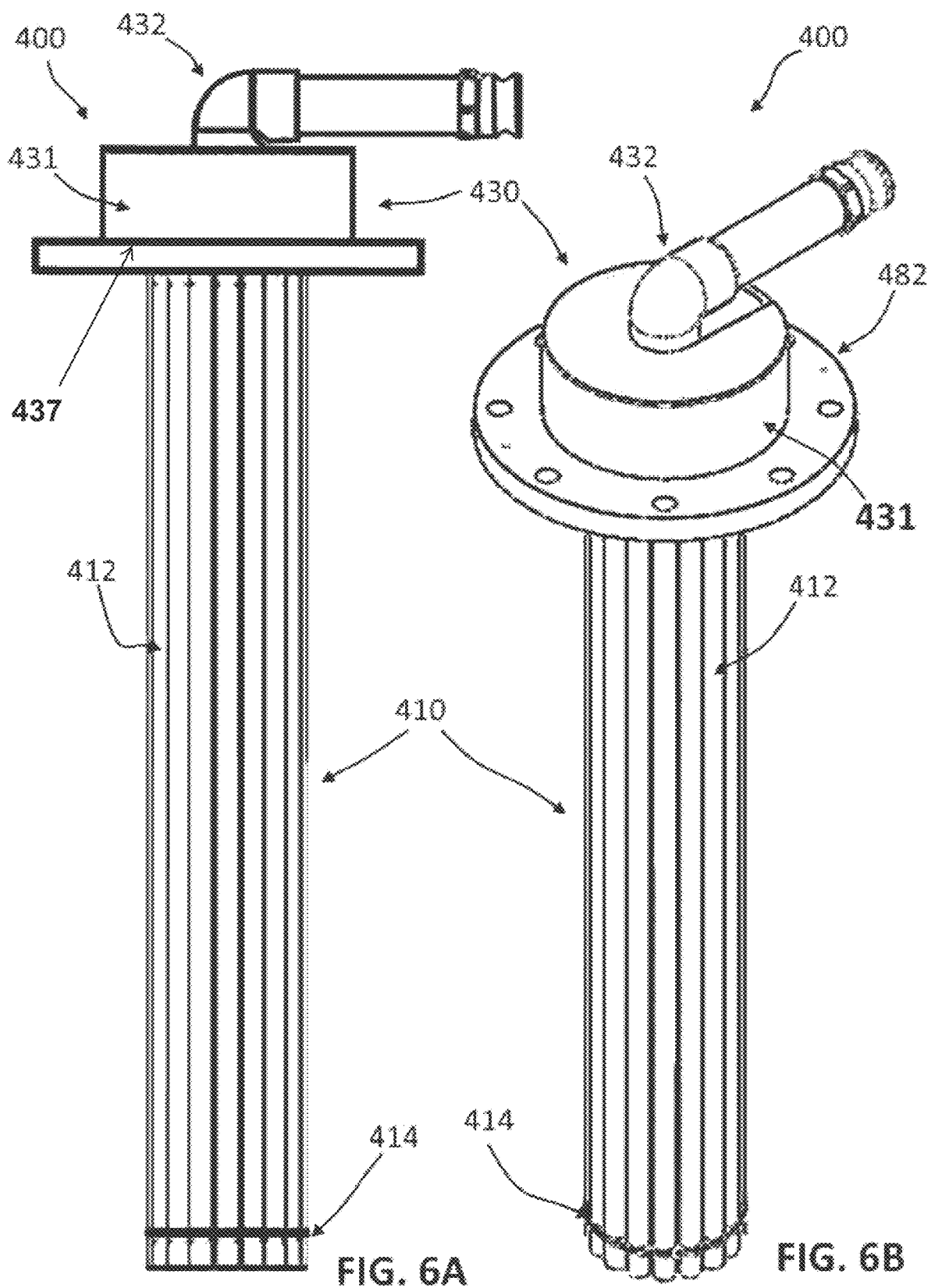

ELECTROLYTIC REACTOR AND METHODS FOR THE ELECTROLYTIC TREATMENT OF FLUIDS

CROSS-REFERENCE TO RELATED APPLICATIONS

There present patent application claims the benefits of priority of U.S. Provisional Patent Application No. 63/160,390 entitled "Electrolytic reactor and methods of the electrolytytic treatment o fluids" and filed at the United States Patent and Trademark Office on Mar. 12, 2021, the content of which is incorporated herein by reference.

FIELD OF THE INVENTION

The present technology generally relates to an electrolytic reactor and its use for the electrolytic treatment of fluids. More particularly, the technology relates an electrolytic reactor for the electrocoagulation, electro-oxidation and electrodisinfection of fluids.

BACKGROUND OF THE INVENTION

The Applicant has developed several electrolytic reactors for the treatment of fluids.

WO 2014/047726 A (Laaroussi et al.) discloses a reactor for separating, harvesting and primary dewatering microalgae biomass from a microalgae solution using electrocoagulation and/or electro-floatation. The reactor may be fed with the solution at a controlled flow rate to induce transition or turbulent flow regime inside the reactor(s). The electrocoagulation reactor comprises a reactor chamber and magnesium-based alloy anodes and/or inert anodes.

WO 2017/070798 A1 (Ben Salah et al.) discloses an electrolytic reactor assembly and method for electrodisinfection, such as for removing microorganisms from water. Each reactor comprises an enclosure or reactor chamber and an electrode assembly inserted thereinto.

WO 2021/151195 (Ben Salah et al.) discloses a process and an apparatus for treating and decontaminating water, more particularly by the electro-chemical treatment of water contaminated with emerging contaminants, such as but not limited to perfluoroalkyl and polyfluoroalkyl substances (PFAS) or medicament residues. The contaminated wastewater is circulated through one or several reactors for electro-oxidizing and degrading the contaminants. Each reactor comprises an enclosure or reactor chamber and an electrode assembly inserted thereinto.

The reactor chambers disclosed in the above cited applications comprise a bottom inlet, typically extending from the chamber in the same direction than the longitudinal length of the reactor, and a top outlet extending from the same chamber perpendicularly to the longitudinal direction. These configurations of the reactors are not particularly suitable for a quick replacement of the electrode cartridge, since a user needs to replace the entire reactor in order to minimize the down time associated with reactor maintenance.

There is still a need for a reactor that is easier to connect and disconnect hydraulically in order to facilitate the replacement of the cartridge, that comprises an improved sealing system between the chamber and the cartridge in order to obtain a higher working pressure inside the chamber, and that improves electrical efficiency and thus reduces energy consumption.

SUMMARY OF THE INVENTION

The shortcomings of the prior art are generally mitigated by the electrolytic reactor as described herein, for the electrolysis of a fluid circulating in the reactor.

According to a first aspect, it is disclosed an electrolytic reactor for the electrolytic treatment of a fluid, the reactor comprising:
an electrolytic chamber having a bottom closed section, a top open section opposite to the bottom closed section, and a peripheral wall extending longitudinally from the bottom closed section to the top open section;
an electrode cartridge comprising an electrode assembly having at least one anode and at least one cathode longitudinally extending from a crown section, the electrode assembly being configured to be electrically connected to and powered by an electric power supply, wherein the crown section of the electrode cartridge is configured to operatively seal the top open section of the electrolytic chamber when the electrode assembly is inserted in the electrolytic chamber through the top open section thereof;
an inlet extending through the peripheral wall adjacent the bottom closed section and configured to be in fluid communication with the electrolytic chamber in order to inject the fluid to be treated therein, the inlet extending perpendicularly to a vertical longitudinal axis defined by the electrolytic chamber; and
an outlet extending through the crown section along the vertical longitudinal axis defined by the electrolytic chamber, the outlet being configured to be in fluid communication with the electrolytic chamber when the electrolytic chamber is sealed by the crown section of the electrode cartridge in order to extract the fluid flowing through the electrolytic chamber.

According to a preferred embodiment, the bottom closed section comprises a bottom sealing system comprising:
a bottom closing ring comprising the inlet and operatively connected to the bottom closed section of the electrolytic chamber;
a closing disk configured to be secured to the bottom closing ring for sealing the chamber; and
optionally, a bottom seal sandwiched between the bottom closing ring and the closing disk.

According to a preferred embodiment, the bottom closing ring and the closing disk are secured together with a plurality of fasteners inserted into a plurality of matching holes disposed around a periphery of the closing ring and disk.

According to a preferred embodiment, the crown section comprises a compartment having a peripheral wall extending between a bottom wall and a top wall opposing the bottom wall, the top and bottom walls having the outlet upwardly extending therethrough, the compartment being configured in size to contain, at least in part, hardwares for mechanically supporting the electrode assembly and electrically connecting the same to the electric power supply.

According to a preferred embodiment, the electrolytic reactor further comprises a top sealing system comprising:
a top closing ring operatively connected to the top open section of the electrolytic chamber, the top closing ring being configured to be secured to a connecting ring outwardly extending from the bottom wall of the compartment of the crown section, for sealing the chamber; and
optionally, a top seal sandwiched between the top closing ring of the top sealing system and the connecting ring of the crown section.

According to a preferred embodiment, the outlet is aligned at a center of the top and bottom walls of the crown section and fluidly connected to the electrolytic chamber through the compartment.

According to a preferred embodiment, the electrode assembly comprises:
- a longitudinal central cathode aligned with the center of the top wall and outlet of the crown section; and
- three semi-concentric longitudinal anodes connected to the crown section for surrounding an entire length of the central cathode.

According to a preferred embodiment, the hardwares for electrically connecting the electrode assembly comprises:
- a cathode connecting assembly having an L shape with an horizontal member operatively connected to and horizontally extending from a top section of the central cathode and a vertical member extending upwardly from the horizontal member through the bottom wall of the compartment and configured for being electrically connected to the power supply; and
- an anode connecting assembly comprising:
  - for each of the three semi-concentric longitudinal anodes, a vertical connecting element operatively connected to and going through the bottom wall of the compartment; and
  - a connecting loop supported inside the compartment by the bottom wall around the outlet for connecting together the three vertical connecting elements of the anodes, the connecting loop being configured for being electrically connected to the power supply.

According to a preferred embodiment, the connecting loop has a closed horseshoe form for leaving a space on the bottom wall for the vertical member of the cathode connecting assembly to go through the bottom wall while avoiding contact with the three vertical connecting elements of the anodes.

According to a preferred embodiment, the anodes are sacrificial anodes comprising: magnesium, aluminum, iron, zinc or alloys thereof, and the central cathode comprises a metallic material selected from the group consisting of iron and alloys thereof, such as steel or stainless steel.

According to a preferred embodiment, the peripheral wall of the electrolytic chamber is configured to form a tubular cathode about the electrode assembly of the cartridge.

According to another preferred embodiment, the electrode assembly of the reactor comprises a beam of 2N longitudinal rods forming the electrodes, with N being an integer number greater or equal to 3, the 2N longitudinal rods being secured to the bottom wall of the crown section and disposed in a cylindrical manner around the vertical axis going through the center of the outlet, the 2N electrodes comprising a first group of N electrodes operatively connected to a first current distribution circuit, and a second group of N electrodes operatively connected to a second current distribution circuit, wherein the N electrodes of the first group alternating with the N electrodes of the second group.

According to a preferred embodiment, each of the two current distribution circuits comprises:
- electrical wires located inside the compartment of the crown section for connecting in series the one electrode to the next electrode of its respective group; and
- one main distribution wire for connecting the electrical wires to the power supply.

According to a preferred embodiment, the first current distribution circuit comprises a first distribution plate, made of an electrical conductive material, supported by the bottom wall of the compartment, and defining a first shape; and the second current distribution circuit comprises a second distribution plate, made of the electrical conductive material, supported by the bottom wall of the compartment and defining a second shape; wherein each distribution plate is configured to connect in parallel the N electrodes of its respective group, and wherein the first and second shapes allow the distribution plates to be inserted in the compartment while keeping a gap therebetween to avoid electrical contact.

According to a preferred embodiment, the first plate has a ring shape extending transversely inside the compartment, whereas the second plate has a star shape configured in size to be located inside the first plate.

According to a preferred embodiment, the ring shape defines a number N of tips extending inwardly, each tip forming an electrical connecting point with one electrode of the same group, whereas the star shape defines a number N of tips extending outwardly toward the first plate, wherein the N tips of the second plate intercalate with the N tips of the first plate along a same circumferential position, the intercalated tips being each electrically connected with one electrode of its respective group.

According to a preferred embodiment, the electrode rods are inert electrodes selected from the group consisting of Dimensionnally Stable Anodes (DSA), Platinum-based anodes and Boron Doped Diamond (BDD).

According to a preferred embodiment, the number N of electrode rods is 6, 9, 12, 16 or 18.

According to a preferred embodiment, the electrolytic chamber defines:
- an electrolysation chamber extending from the top open section of the electrolytic chamber and configured for containing the electrode assembly; and
- a flow dispersion chamber located below the electrolysation chamber adjacent the bottom closed end for receiving the fluid from the inlet.

According to a preferred embodiment, the electrolytic reactor further comprises a temperature control unit for controlling a temperature inside the electrolytic chamber.

According to a preferred embodiment, the electrolytic reactor further comprises a control module for modulating a flow rate of the fluid circulating in the reactor and/or controlling a retention time of the fluid inside the electrolytic chamber.

According to a preferred embodiment, the control module comprises a modulating valve operatively connected to a control panel for modulating the flow rate and/or retention time.

According to a preferred embodiment, the electrolytic reactor further comprises a guiding mechanism so as to ensure proper insertion of the cartridge in the electrolytic chamber, and/or a latching mechanism associated with a clicking sound for alerting a user that the electrode cartridge has been properly inserted in the electrolytic chamber.

It is also disclosed a method for the electrolytic treatment of a fluid comprising circulating the fluid from the inlet to the outlet of the electrolytic reactor as defined herein, while electrically powering the electrode assembly for electrolysing the fluid. Preferably, the fluid is a wastewater comprising contaminants, the electrolytic treatment of the fluid comprises electrocoagulation, electrooxidation and/or electrodesinfection of the contaminants.

It is also disclosed a reactor assembly for the treatment of a fluid, the reactor assembly comprising:
- at least one electrolytic reactor as defined herein;
- an electrical power supply operatively connected to electrode assembly of each of the at least one reactor; and a pump fluidly connected to the inlet of the at least one electrolytic reactor for circulating the fluid inside the reactor assembly.

According to a preferred embodiment, the reactor assembly further comprises a concentrating module fluidly connected to the inlet of the at least one electrolytic reactor for concentrating contaminants contained in the fluid before injecting the same in the at least one electrolytic reactor for treatment.

According to a preferred embodiment, the reactor assembly further comprises a filtering module fluidly connected to the outlet of the at least one electrolytic reactor for filtering the fluid once treated in the at least one electrolytic reactor. Preferably, the filtering module comprises activated carbon as filtering agent.

According to a preferred embodiment, the reactor assembly comprises two or more of said at least one electrolytic reactor, wherein: the reactors are fluidly connected in series, the inlet of a first reactor being fluidly connected to the pump and the concentrating module, and the outlet of a last reactor being fluidly connected to the filtering module; or the reactors are fluidly connected in parallel, the inlets of each of the two or more of said at least one electrolytic reactor being fluidly connected to the pump and the concentrating module, and the outlets of each of the two or more of said at least one electrolytic reactor being fluidly connected to the filtering module.

According to a preferred embodiment, the reactor assembly further comprises a control module for modulating a flow rate of the fluid circulating in the at least one reactor and/or for controlling a retention time of the fluid inside the electrolytic chamber.

According to a preferred embodiment, the control module comprises a modulating valve operatively connected to a control panel for modulating the flow rate and/or retention time.

According to a preferred embodiment, the control panel is also operatively connected to the electric power supply for controlling current density.

It is also disclosed a method for the electrolytic treatment of a fluid comprising circulating the fluid through the reactors of the reactor assembly a defined herein, while electrically powering the at least one electrode assembly for electrolysing the fluid.

According to a preferred embodiment, the fluid is a wastewater comprising contaminants, the electrolytic treatment of the fluid comprises electrocoagulation, electrooxidation and/or electrodesinfection of the contaminants.

Advantageously, the outlet of the crown section being extending upwardly and in fluid communication with the crown section, and therefore with the reactor chamber only once the reactor chamber is sealed by the crown section, allows increasing the active surface of the electrodes inside the chamber.

Other and further aspects and advantages of the present invention will be better understood upon the reading of the illustrative embodiments about to be described or will be indicated in the appended claims, and various advantages not referred to herein will occur to one skilled in the art upon employment of the invention in practice.

BRIEF DESCRIPTION OF THE DRAWINGS

The above and other aspects, features and advantages of the invention will become more readily apparent from the following description, reference being made to the accompanying drawings in which:

FIG. 1A is a perspective side view of the reactor according to a preferred embodiment;

FIG. 1B is a top view of the reactor illustrated in FIG. 1A with a cap covering the compartment of the crown section, according to a preferred embodiment;

FIGS. 4A is a perspective view of the electrode cartridge of FIG. 3, with one of the semi-concentric anodes removed to see the central cathode, according to a preferred embodiment;

FIGS. 4B is a perspective view of the central cathode of the electrode cartridge of FIG. 3, according to a preferred embodiment;

FIG. 4C is shows the bottom guiding disk of the electrode cartridge according, to a preferred embodiment;

FIGS. 6A is a side plan view of an electrode cartridge with beam of rod electrodes, according to a preferred embodiment;

FIGS. 6A is a perspective view of the electrode cartridge with beam of rod electrodes of FIG. 6B, according to a preferred embodiment;

DETAILED DESCRIPTION OF PREFERRED EMBODIMENTS

Figure 2A:
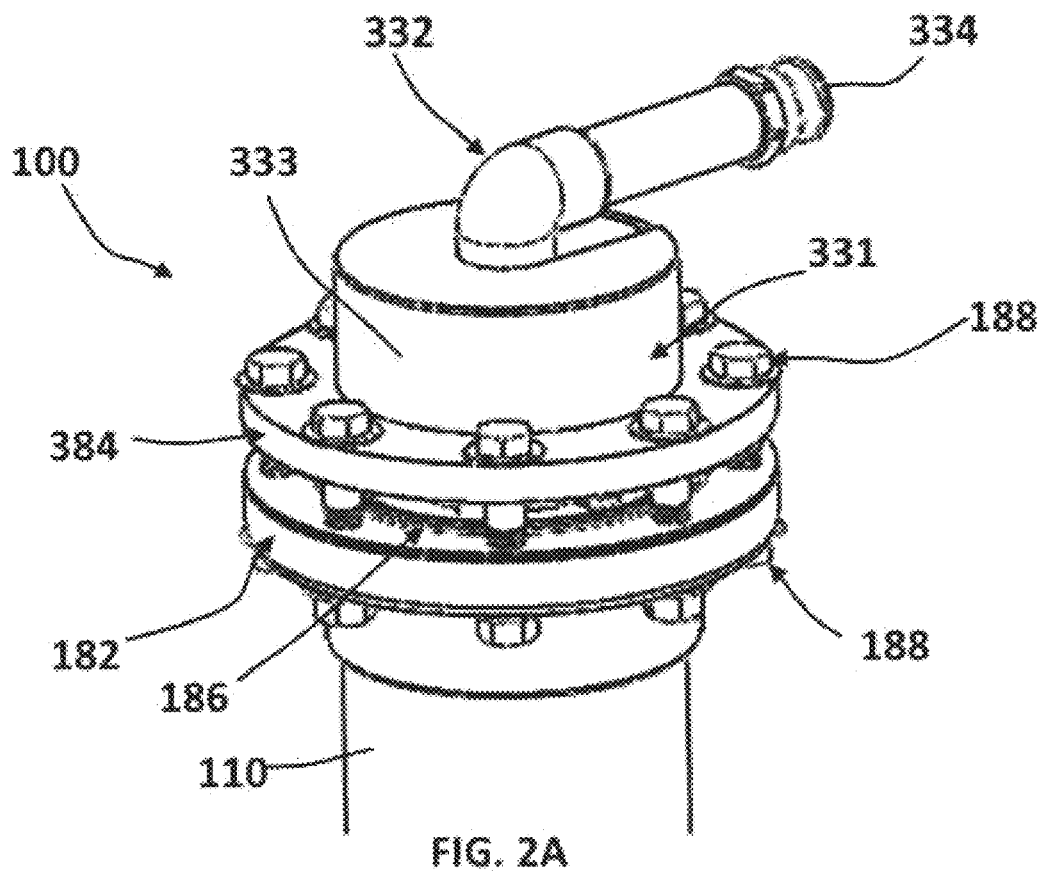
FIG. 2A is a partial perspective side view of the top section of the reactor showing the electrode cartridge not fully connected to the reactor body according to a preferred embodiment.
Figure 2B:
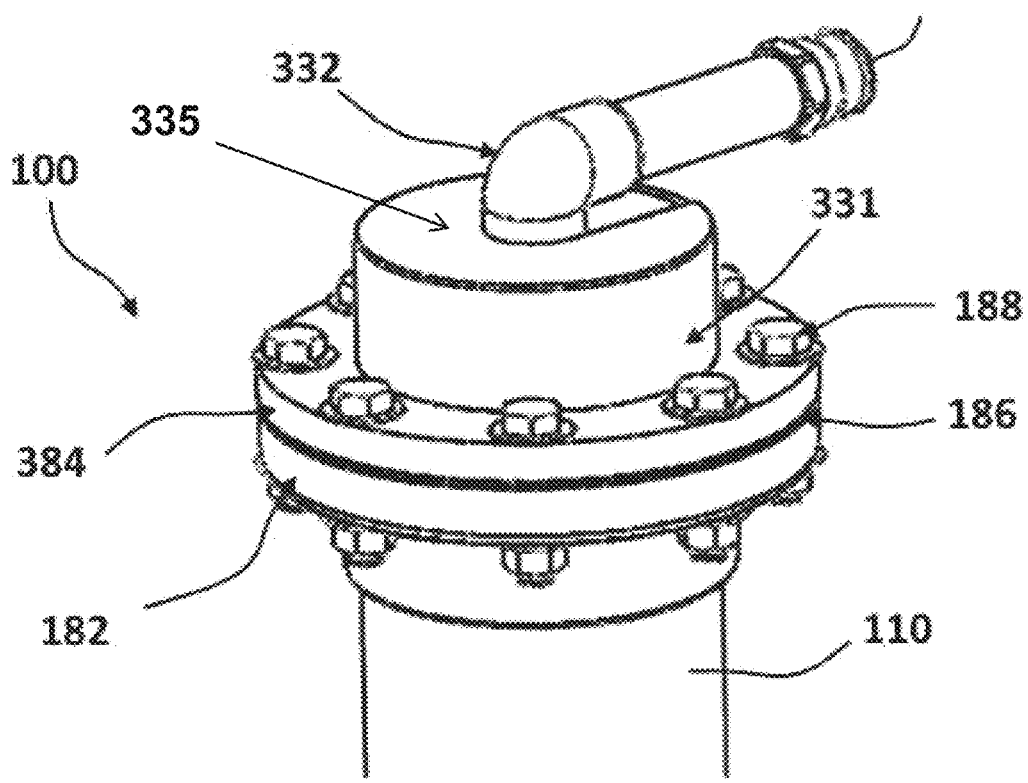
FIG. 2B is a partial perspective side view of the top section of the reactor showing the electrode cartridge fully connected to the reactor body according to a preferred embodiment.

A novel electrolytic reactor will be described hereinafter. Although the invention is described in terms of specific illustrative embodiments, it is to be understood that the embodiments described herein are by way of example only and that the scope of the invention is not intended to be limited thereby.

The terminology used herein is in accordance with definitions set out below.

As used herein % or wt. % means weight % unless otherwise indicated. When used herein % refers to weight % as compared to the total weight percent of the phase or composition that is being discussed.

By "about", it is meant that the value of weight, time, pH, volume, amperage or temperature can vary within a certain range depending on the margin of error of the method or device used to evaluate or measure such weight, time, pH, volume, amperage or temperature. A margin of error of 10% is generally accepted.

The description which follows, and the embodiments described therein are provided by way of illustration of an example of particular embodiments of principles and aspects of the present invention. These examples are provided for the purposes of explanation and not of limitation, of those principles of the invention. In the description that follows, like parts and/or steps are marked throughout the specification and the drawing with the same respective reference numerals.

An electrolytic reactor with simplified operating procedures will be described herein.

According to a preferred embodiment, as the one illustrated on FIGS. 1A, 1B, 2A and 2B, the electrolytic reactor (100) first comprises an electrolytic chamber (110) having a bottom closed section (120) forming a closed end, an opposite top open section (170) forming an open end, and a peripheral wall (112) extending longitudinally from the bottom closed section (120) to the top open section (170).

The electrolytic reactor also comprises an electrode cartridge (300, 400), such as the ones better described hereinafter in reference to FIGS. 3 to 5, or FIGS. 6 to 10.

Figure 3:
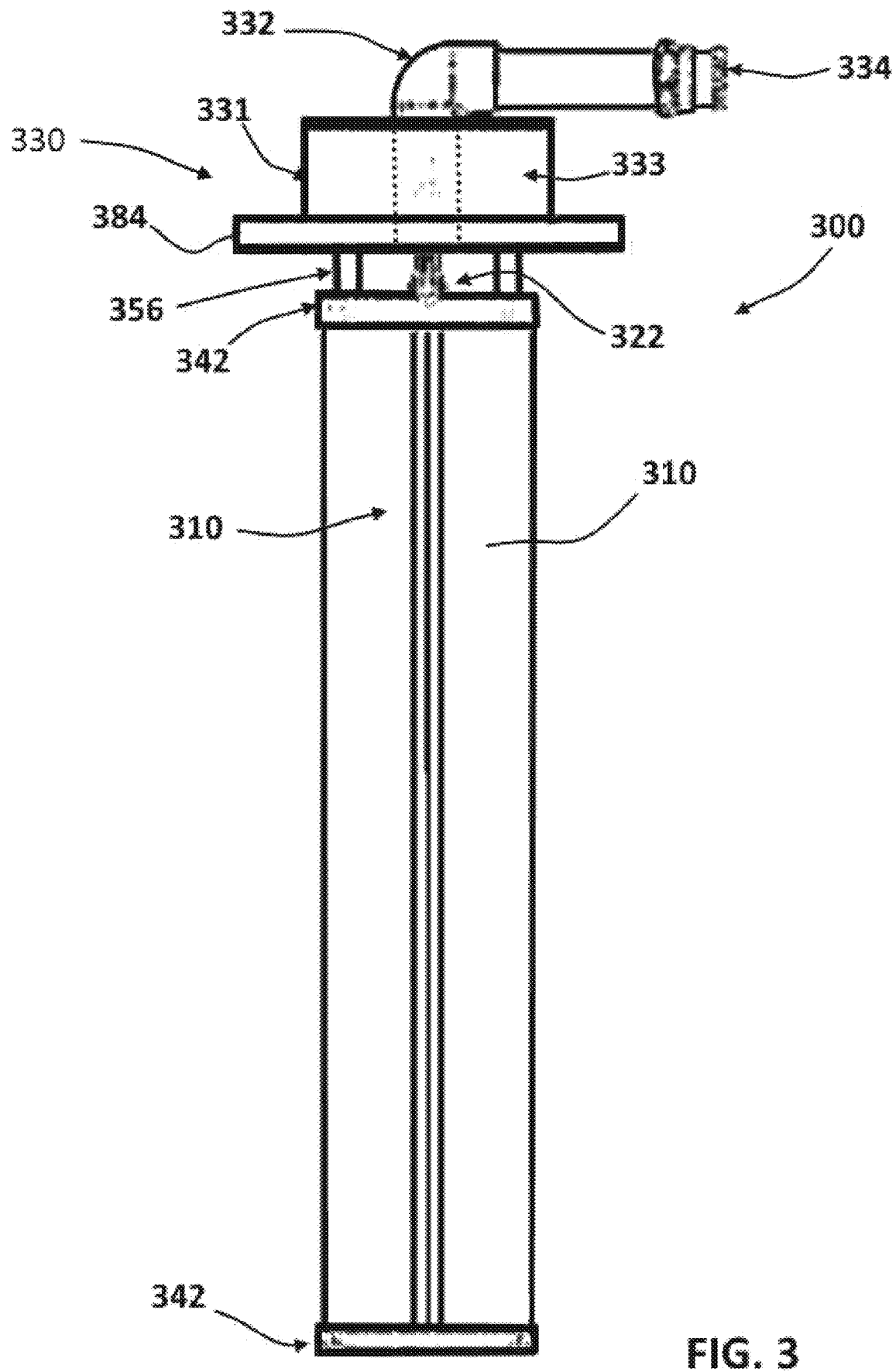
FIG. 3 is a side plan view of an electrode cartridge with semi-concentric anodes, according to a preferred embodiment.

Referring to FIG. 3 for instance, the reactor (100) comprises an electrode cartridge (300) comprising an electrode assembly having at least one anode (310) and at least one cathode (320) longitudinally extending from a crown section (330). The electrode assembly is configured to be electrically connected to and powered by an electric power supply, and the crown section (330) of the electrode cartridge is configured to operatively seal the top open section (170) of the electrolytic chamber when the electrode assembly is inserted in the electrolytic chamber through the top open section thereof, forming as such the reactor (100).

The reactor (100) also comprises an inlet (140) extending through the peripheral wall (112) adjacent the bottom closed section (120). The inlet (140) is configured to be in fluid communication with the electrolytic chamber (110) in order to inject the fluid to be treated therein. As shown on FIG. 1A, 1B, 5B or 8, the inlet (140) extends perpendicularly to a vertical longitudinal axis defined by the electrolytic chamber (110).

The reactor (100) further comprises an outlet (332) extending through the crown section (330) along the vertical longitudinal axis defined by the electrolytic chamber (110). The outlet (332) is configured to be in fluid communication with the electrolytic chamber when the electrolytic chamber (110) is sealed by the crown section (330) of the electrode cartridge in order to extract the fluid flowing through the electrolytic chamber. When the anode(s) and cathode(s) are inserted in the electrolytic chamber (110) through the top open end (170), the crown section (330) operatively seals the top open end (170) of the electrolytic chamber forming as such the reactor (100), as the one depicted on FIG. 1 for instance.

The inlet (140) and the outlet (332) are preferably equipped with a cam and slot fittings (334) to ease hydraulic connection. The inlet of electrolytic chamber and the outlet of the cartridge are indeed in fluid communication with the electrolytic chamber when the chamber is sealed by the crown section of the cartridge.

According to a preferred embodiment, as the one illustrated on FIG. 1A, the bottom closing section (120) of the reactor (100) may be closed with a bottom sealing system (130) first comprising a bottom closing ring (134) operatively connected to the bottom closed section of the electrolytic chamber and comprising the inlet (140) outwardly extending therefrom. The bottom sealing system (130) also comprises a closing disk (132) configured to be secured to the bottom closing ring (134) for sealing the chamber. Preferably, a bottom seal or compressible sealing member (136) can be sandwiched between the bottom closing ring and the closing disk for increasing tightness. The compressible member is preferably made from a high temperature and high pressure resistant material such as ethylene propylene diene monomer (EPDM), fluorocarbon or a silicone-based seals, preferably a silicone-based gasket. The closing ring can be secured to the second disk using a plurality of fasteners (188) inserted into a plurality of holes (187) disposed around the periphery of the ring and disk. Fasteners may be selected from a variety of typical fasteners commonly used in the art such as high grade carbon steel bolts, preferably grade 8 or above.

As shown on FIG. 2, the crown section (330) preferably comprises a compartment (331) having a peripheral wall (333) extending between a bottom wall (337) and a top wall (335) opposing the bottom wall. The top and bottom walls having the outlet (332) upwardly extending therethrough. The compartment (331) is configured in size to contain, at least in part, hardwares for mechanically supporting the electrode assembly and electrically connecting the same to the electric power supply.

The electrolytic reactor (100) may further comprise a top sealing system (180) comprising: a top closing ring (182) operatively connected to the top open section of the electrolytic chamber, the top closing ring being configured to be secured to a connecting ring (384) outwardly extending from the bottom wall (337) of the compartment of the crown section, for sealing the chamber. Preferably, a top seal is sandwiched between the top closing ring (182) of the top sealing system (180) and the connecting ring (384) of the crown section. As shown on FIG. 2B, the top closing ring (182) is secured to the connecting ring (384) once the cartridge is inserted into the chamber, using a plurality of fasteners (188) inserted into a plurality of holes (187) disposed around the periphery of each disk. The fasteners and compressible member for the second sealing system may be identical to the ones disclosed above for the bottom sealing system (130).

The outlet (332) of the cartridge (300) is in fluid communication with the chamber (110) for the treated fluid to exit the reactor, and extends upwardly from the crown section. As shown in the Figures, the outlet is preferably aligned at a center of the top and bottom walls of the crown section and fluidly connected to the electrolytic chamber through the compartment. As such, this specific position of the outlet above the electrodes eliminates any dead zone typically found on electrodes at the level of the outlet with the useful surface area of the electrodes spanning the entire length of the chamber (110). This configuration also increases the effective volume of the reactor. In addition, the outlet located above of the electrode assemblies eases the evacuation outside of the reactor of any gas produced during the electrolytic treatment of the fluid, such as dihydrogen ($H_2$).

According to another embodiment, the chamber (110) may be equipped with one or more high temperature switches (115), generally used to prevent overheating of the reactor (100) in no-flow or in low-flow conditions. The high temperature switches (115) are generally connected to a security relay installed in a control panel. In the event that one of the high temperature switches is activated due to a rise in temperature in the reactor beyond a pre-defined temperature setting, the security relay shall turn off the system and the corresponding power supply in order to prevent overheating.

According to a preferred embodiment, the reactor (100) may comprise a guiding mechanism (not illustrated) so as to ensure proper insertion of the cartridge. A latching mechanism associated with a clicking sound may optionally be included to provide an extra safety mechanism and alert the user that the cartridge has been properly inserted. Since the cartridge is already electrically and hydraulically connected, the insertion of the electrode cartridge inside the body of the reactor is the only assembly required before operating the reactor. Indeed, only a subsequent "Plug and Play" step is required to operate the reactor.

The improved sealing system allows the reactor to withstand higher operating pressure, which makes it possible to inject fluid through the inlet at greater velocity, thereby increasing the volume of fluid that can be treated in a given amount of time. The higher operating pressure is accompanied with greater turbulent flow conditions that forces the fluid to be treated from the bottom section of the reactor to the top section of the reactor.

The electrolytic reactor as disclosed herein may comprise different types of anodes made from different materials and having various geometries such as, but not limited to semi-cylindrical, cylindrical (rods), squared, or conical, in combination with either one or two cathodes. The geometry and material of the anodes is selected according to the electrolytic process being performed, such as electrocoagulation (EC), electrooxidation (EO) and electrodisinfection (ED). For instance, rod-shaped anodes are preferably used for EO and ED treatment. Two differents embodiments for the electrodes are now described in more details.

Semi-Concentric Anodes

According to a preferred embodiment as depicted in FIGS. 3 and 4, the electrode cartridge (300) to be inserted in the chamber (110) of the reactor preferably comprises three semi-concentric anodes (310) surrounding an internal cathode (320), which is visible in FIG. 4. The power supply preferably provides a DC—direct current. The longitudinal central cathode (320) (FIG. 4B) is aligned with the center of the top wall and outlet (332) of the crown section. Two of the three anodes (310) of the electrode cartridge (300) are removed in FIG. 4A to show the central cathode (320) spanning the entire length of the surrounding anodes (310). The central cathode (320) may comprise an electrical connecting element (322) extending from the top section of the cathode, and a guiding pin (324) extending from the bottom section of the cathode (see FIG. 4C). The electrodes are secured together using top and bottom guiding disks (340, 342) such that when the electrode cartridge is inserted in the body of the reactor, the top guiding disk (340) is located below the connecting ring (384) of the cartridge (see FIG. 3 or 5). The guiding disks (340, 342) are configured to secure the concentric anodes (310) around the central cathode (320) of the electrode cartridge (300). A functional electrolytic reactor (100) is thus formed once the cartridge has been inserted in and connected to the chamber of the reactor (FIG. 1A). The configuration of the cartridge as disclosed herein allows reducing the anode-to-cathode distance (ACD) and therefore decreasing the consumption of electricity.

According to a preferred embodiment, the semi-concentric anodes may be sacrificial anodes comprising for instance: magnesium, aluminum, iron, zinc or alloys therof, or any other suitable material known in the art for the making of sacrificial anodes.

According to a preferred embodiment, the central cathode comprises a metallic material selected from the group consisting of iron and alloys thereof, such as steel and stainless steel.

In order to seal the reactor, a compressible sealing member (186) can be placed on the top closing ring (182) before inserting the cartridge (300) and sandwiched between the rings (182, 384). Fasteners (188) are then inserted in the holes and tightened so as to create a tight seal between the top of the reactor chamber and the cartridge.

Figure 5A:
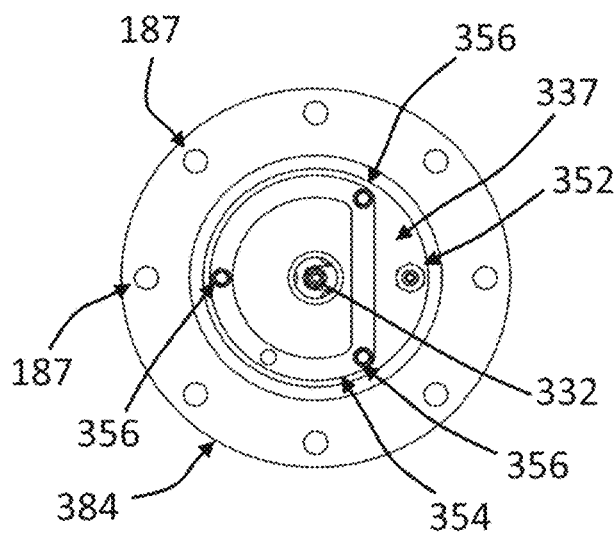
FIG. 5A is a top view of the crown section of the reactor according to a preferred embodiment.
Figure 5B:
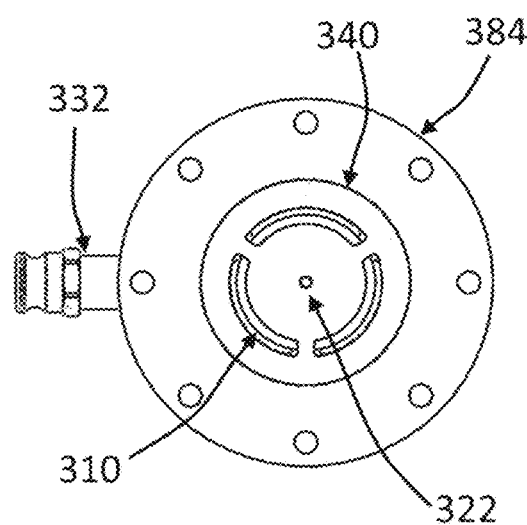
FIG. 5B is a top view of the bottom section of the reactor according to a preferred embodiment.
Figure 5C:
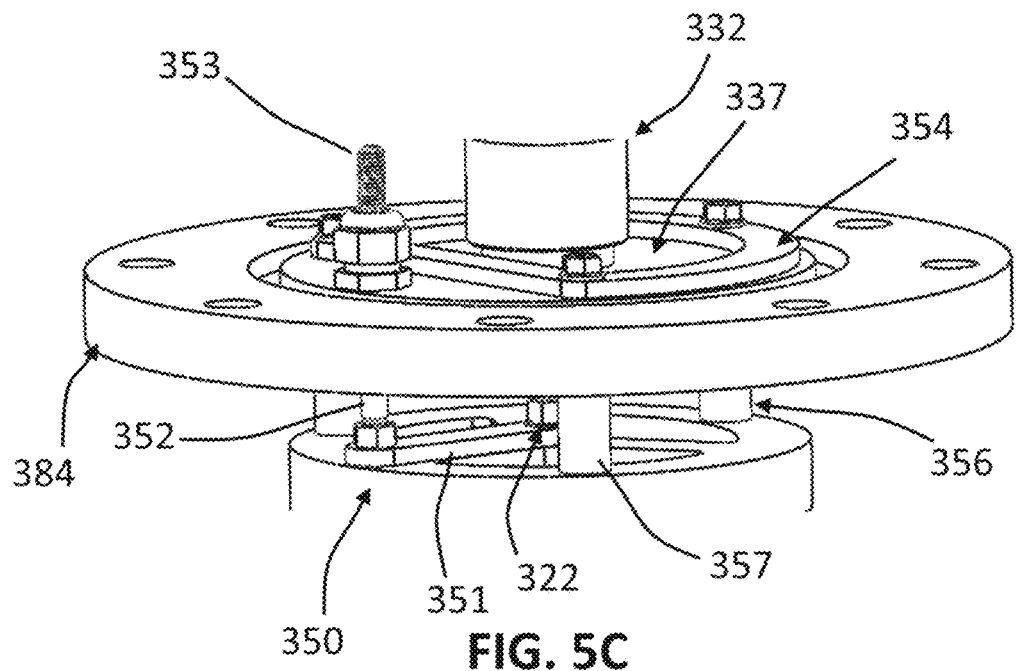
FIG. 5C is a partial perspective side view of the crown section of the reactor according to a preferred embodiment.

FIGS. 5A and 5C show in details the electrical connections inside the crown section of the cartridge (300). As shown in FIG. 5C, the central cathode is connected by way of a cathode connecting assembly (350) having an L shape with an horizontal member (351) operatively connected to and horizontally extending from the top section of the central cathode, preferably equipped with the electrical connecting element (322). The L-shaped connecting assembly also comprises a vertical member (352) extending upwardly from the horizontal member (351) through the bottom wall (337) of the compartment and configured for being electrically connected to the power supply. The vertical member (352) may comprise for instance a threaded fastener (353) passing through the bottom wall (337) and electrically connected to the horizontal connecting member (351) located on top of the top guiding disk (340) extending toward and connected to the first electrical connecting element (322) of the central cathode (320).

FIG. 5A is a top view of the bottom wall (337) with the connecting ring (384) extending outwardly therefrom. The connecting ring (384) preferably comprises holes (187) disposed along its periphery and defining a central circular portion having a diameter matching in size with the diameter of the electrodes of the cartridge (300). The central portion comprises an electrical connecting loop (354), preferably having a closed horseshoe form, for electrically connecting the three concentric anodes (310) via three vertical connecting elements (356) passing through the disk (384), while leaving a space for the vertical connecting member (352) of the cathode, and then avoiding contact with the three vertical connecting elements (356) of the anodes. Preferably, the vertical connecting elements (356) of the anodes may be embedded in an electrical insulating element (357), for safety sake The connecting loop (354) is preferably made from a conductive material such as aluminum and/or copper. One of the three connection points (356) with one of the three concentric anodes (310) are shown in FIG. 5C. FIG. 5B shows the bottom surfaces of the guiding disk (340) and top closing ring (182) wherein the electrodes have been removed.

Electrode Rods

According to another preferred embodiment, as the one illustrated on FIGS. 6-10, the cartridge (400) comprises an electrode assembly (410) with a beam of 2N longitudinal rods (412) forming the electrodes. N is an integer number greater or equal to 3. Preferably, N is 6, 9, 12, 16 or 18.

Figure 9:
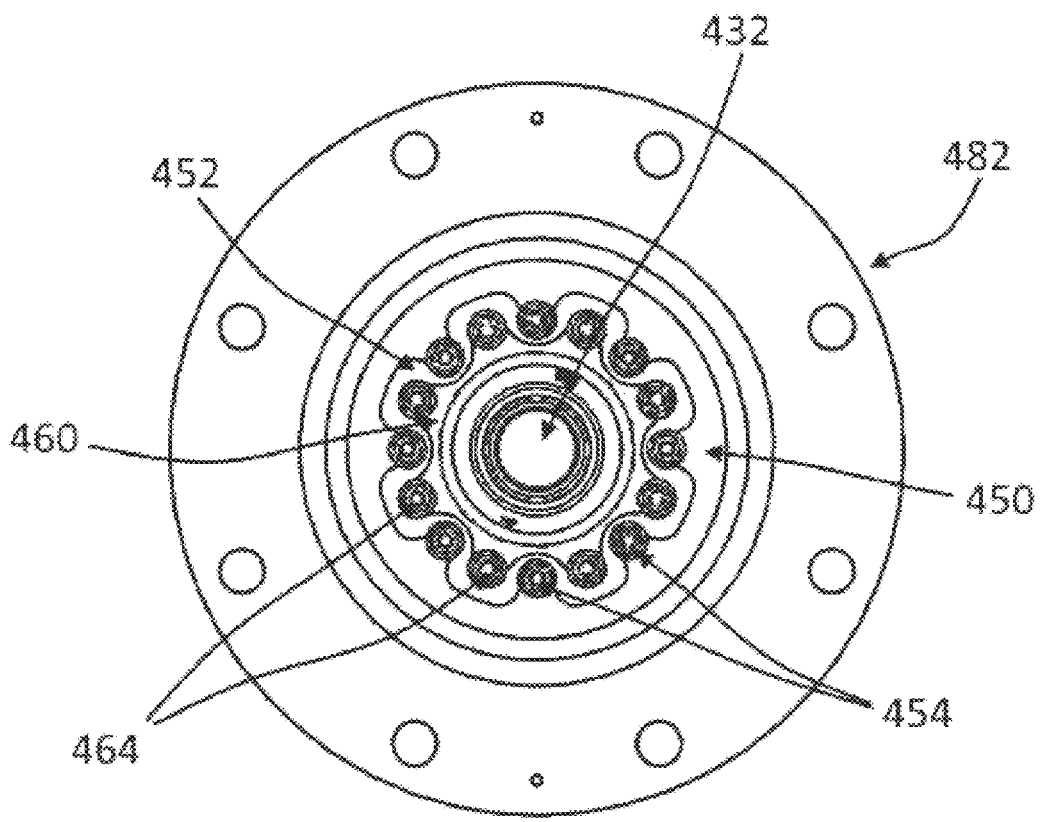
FIG. 9 shows the electric connection or the electrodes rods to the crown section, according to a preferred embodiment.
Figure 10:
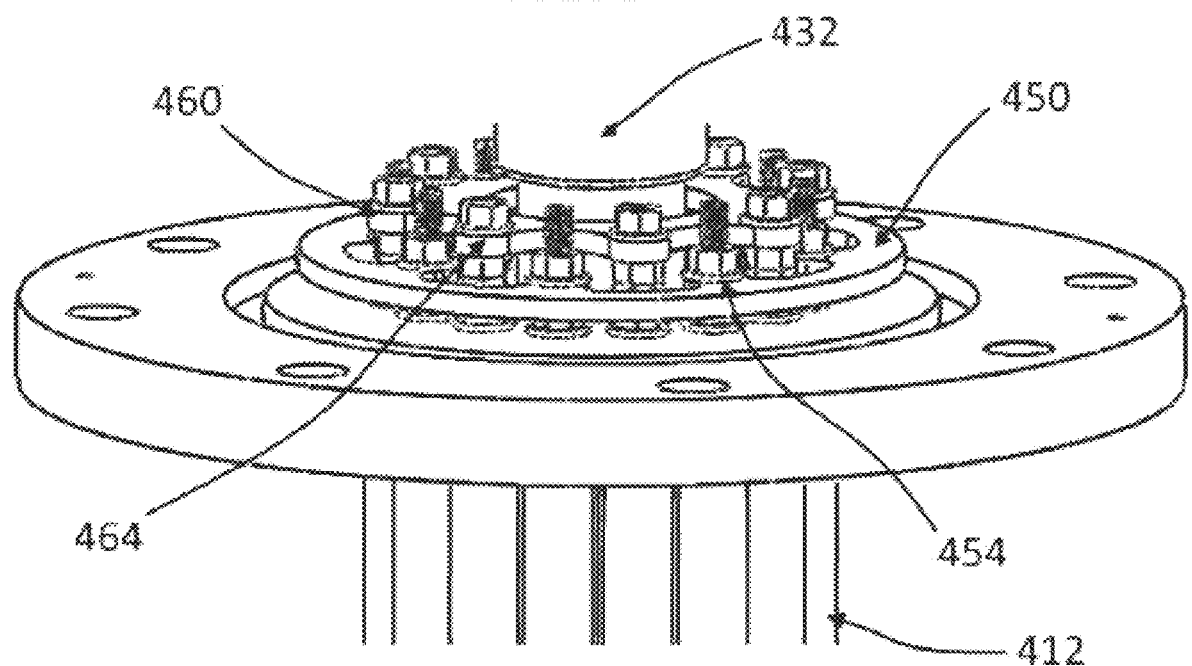
FIG. 10 is a perspective view of the crwon section illustrated on FIG. 9.

As shown on FIGS. 9-10, the 2N longitudinal rods (412) are secured to the bottom wall (482) of the crown section (430) and disposed in a cylindrical manner around the vertical axis going through the center of the outlet (432), the 2N electrodes comprising a first group of N electrodes operatively connected to a first current distribution circuit, and a second group of N electrodes operatively connected to a second current distribution circuit, wherein the N electrodes of the first group alternating with the N electrodes of the second group. The electric power supply provides a direct current making one group of N electrodes being anodes when the other group of electrodes are cathodes, and vice-versa.

According to a first embodiment (not illustrated), each of the two current distribution circuits comprises electrical wires located inside the compartment of the crown section for connecting in series the one electrode to the next electrode of its respective group; and one main distribution wire for connecting the electrical wires to the power supply.

According to a second embodiment illustrated on FIGS. 9 and 10, the first current distribution circuit comprises a first distribution plate (450), made of an electrical conductive material, supported by the bottom wall (437) of the compartment (431), and defining a first shape; and the second current distribution circuit comprises a second distribution plate (460), made of the electrical conductive material, supported by or above the bottom wall of the compartment and defining a second shape. Each distribution plate is configured to connect in parallel the N electrodes of its respective group. The first and second shapes allow the distribution plates to be inserted in the compartment while keeping a gap (452) therebetween to avoid electrical contact.

As shown on FIG. 9, the first plate (450) has a ring shape extending transversely inside the compartment, whereas the second plate (460) has a star shape configured in size to be located inside the first plate. The ring shape defines a number N of tips (454) extending inwardly, each tip forming an electrical connecting point with one electrode of the same group, whereas the star shape defines a number N of tips (464) extending outwardly toward the first plate, wherein the N tips of the second plate intercalate with the N tips of the first plate along a same circumferential position, the intercalated tips being each electrically connected with one electrode of its respective group.

Figure 7:
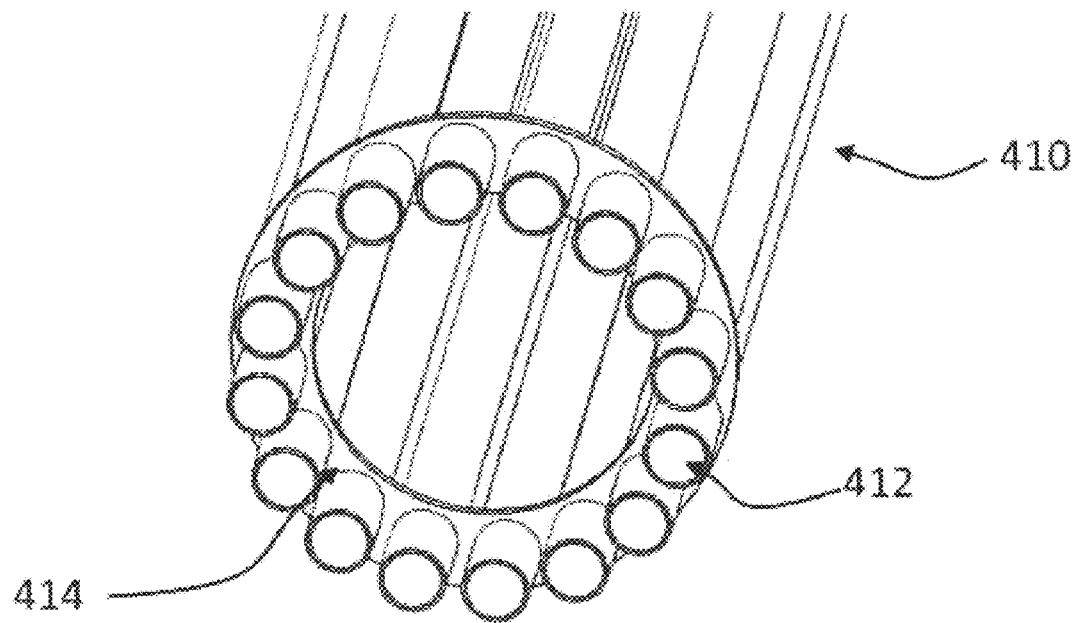
FIG. 7 is a close detail of the bottom section of the beam of rod electrodes illustrated on FIG. 6, according to a preferred embodiment.
Figure 8:
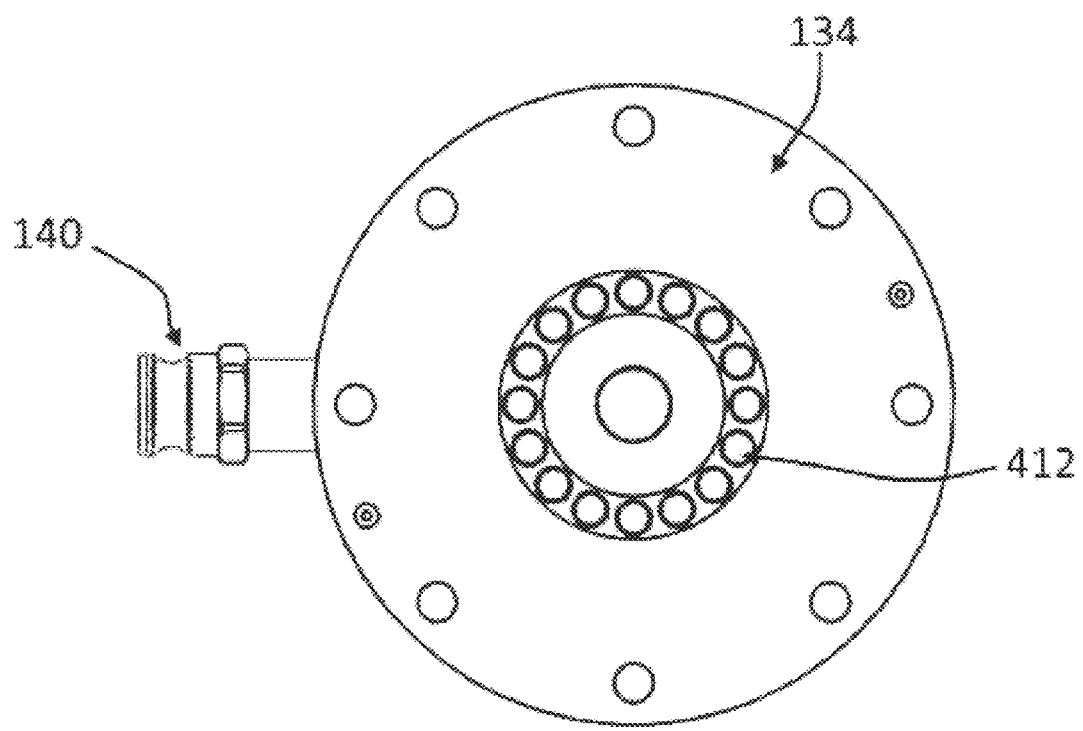
FIG. 8 shows the bottom section of the reactor with beam of rod electrodes, according to a preferred embodiment.

FIG. 7 shows the bottom arrangement of the electrode assembly (410) of electrodes (412) maintained in place in a cylindrical manner thanks to a positioning disk (414). FIG. 8 shows the position disk and electrodes connected to the bottom disk of the reactor.

Figure 14:
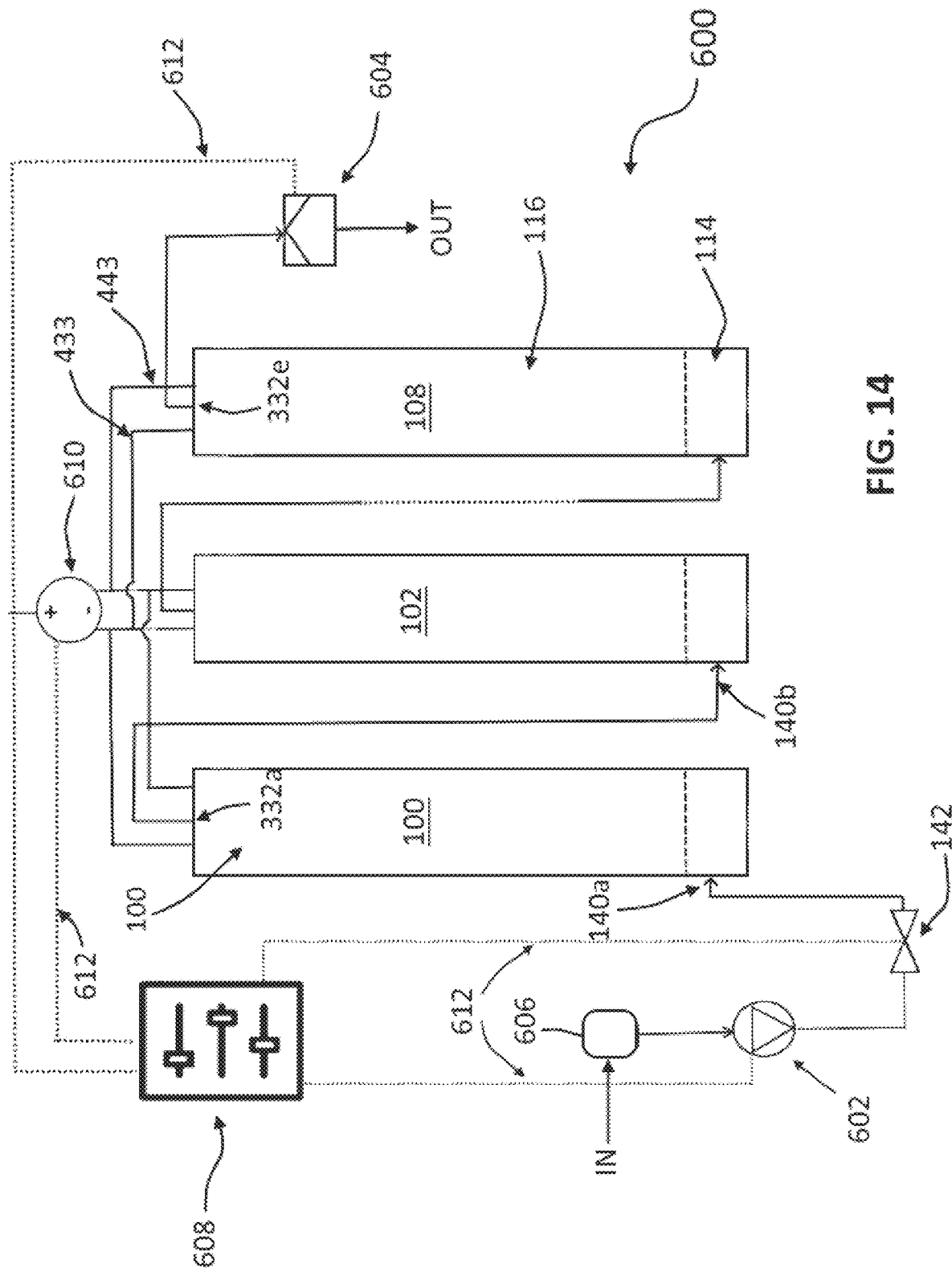
FIG. 14 is a schematic illustration of a reactor assembly with three reactors in series fluidly connected upstream to a concentration module and a pump, and downstream to a filtering module, according to a preferred embodiment.

According to a preferred embodiment, each of the two current distribution circuits comprises one main distribution wire (433, 443), such as those illustrated on FIG. 14, for connecting the electrical wires to the power supply (610). The one main distribution wire is configured to pass through the peripheral wall of the compartment (431) for connecting to the power supply.

According to a preferred embodiment, various light materials such as copper, aluminum, and/or polyvinyl chloride (PVC) can be used for the manufacturing of the reactor to ease maintenance, storage and transportation. For instance, the body of the reactor is preferably made from PVC to make the whole reactor lighter.

According to a preferred embodiment, the electrode rods may be inert electrodes such as for instance: Dimensionnally Stable Anode (DSA), Platinum-based anodes, Boron Doped Diamond (BDD) anodes or any other suitable inert electrodes. DSA preferably comprises a titanium base metal covered by a thin conducting layer of iridium dioxide.

According to a preferred embodiment, the inside wall of the reactor is configured to form a second tubular cathode about the anodes.

Figure 12:
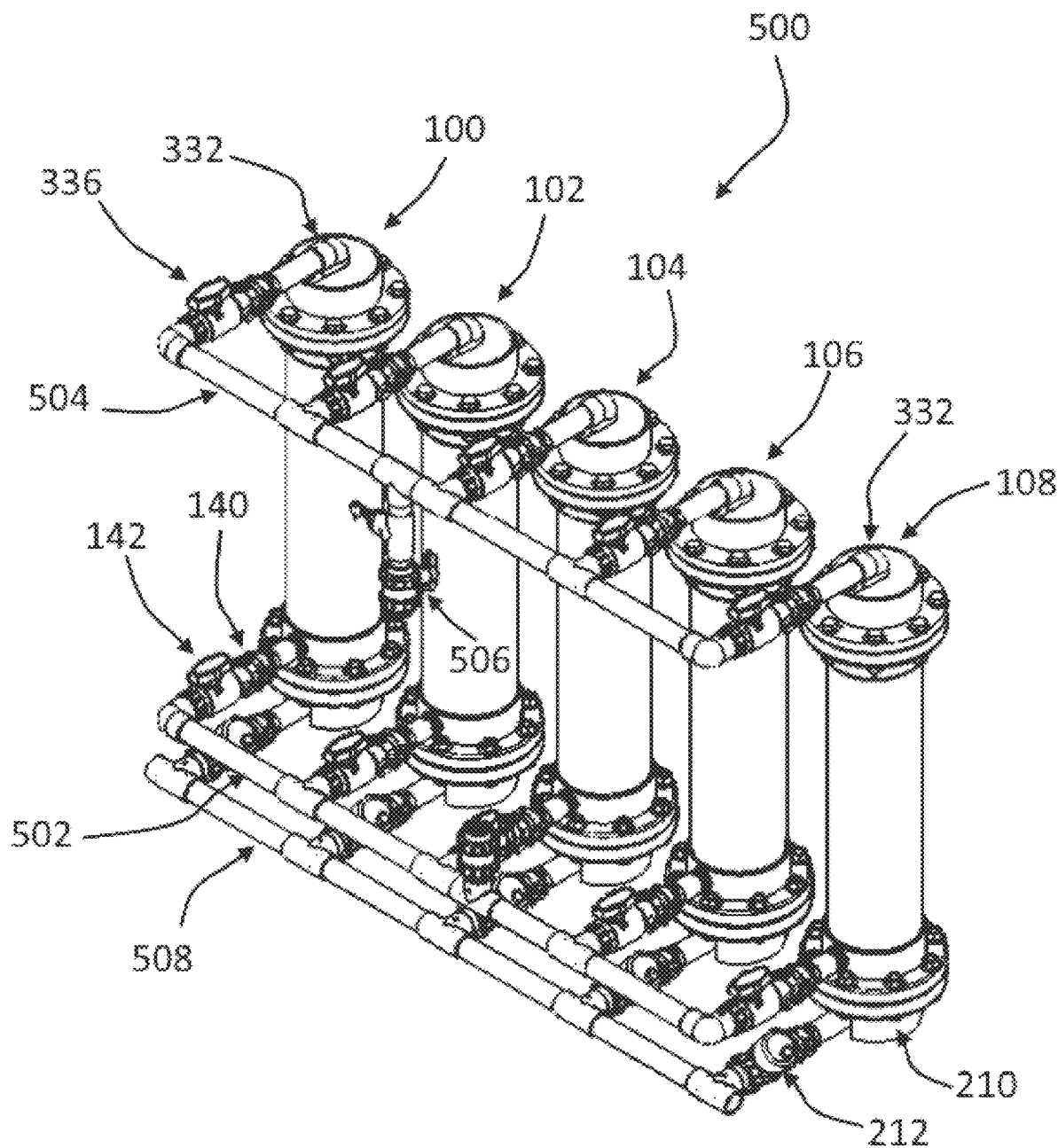
FIG. 12 shows a reactor assembly with five electrolytic reactors arranged in a parallel, according to a preferred embodiment.

According to a preferred embodiment depicted in FIG. 12, five electrolytic reactors (100, 102, 104, 106, 108) are arranged according to a parallel configuration to form a reactor assembly (500).

Figure 11:
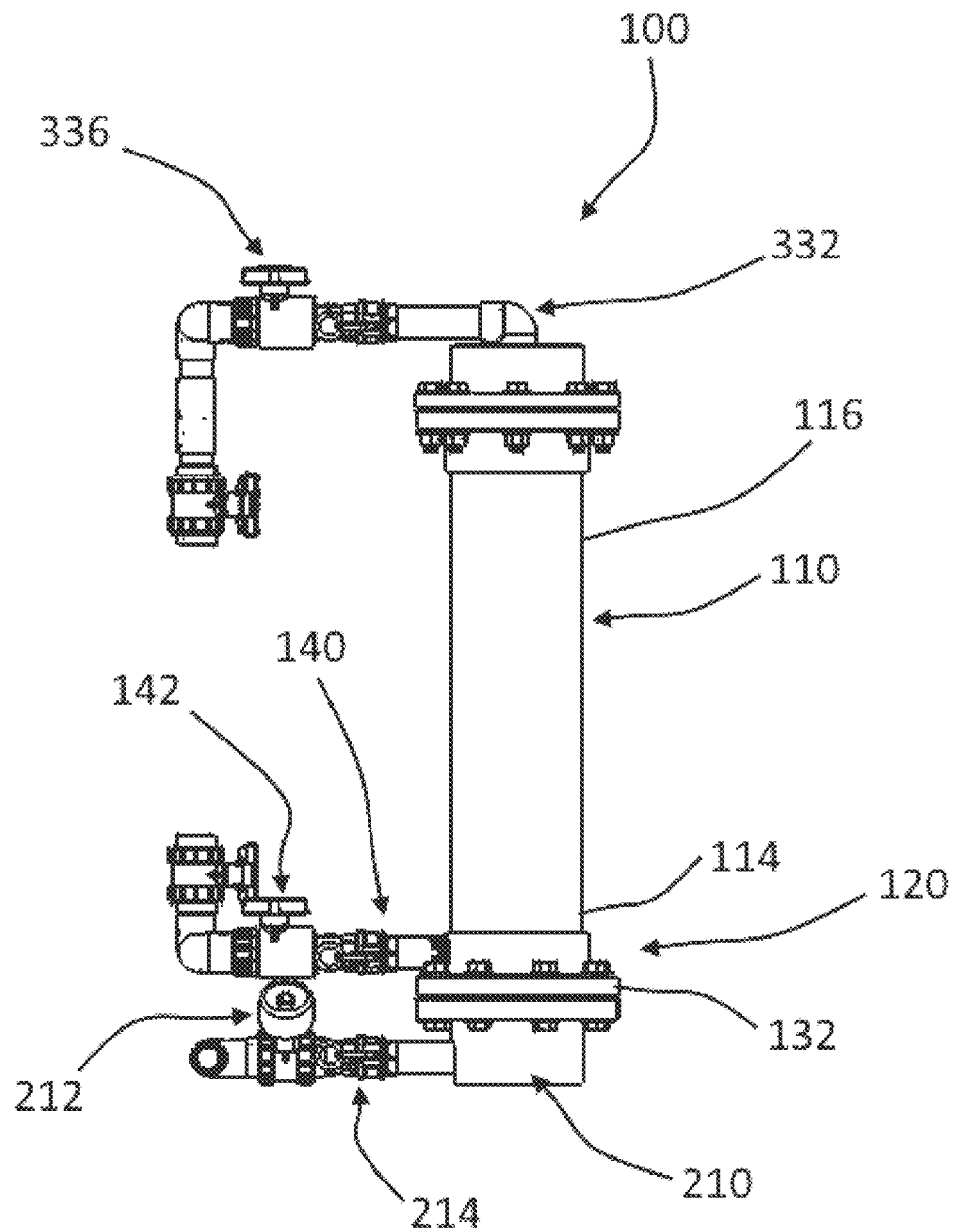
FIG. 11 shows an electrolytic reactor assembly according to a preferred embodiment.

As detailed on on FIG. 11, each reactor (100) may further comprise a flushing outlet (210), for fluidly connecting the electrolytic chamber (110) to a discharge line (214) for flushing by-products and debris produced inside the reactor. Preferably, the electrolytic chamber (110) defines a flow dispersion chamber (114) typically located below an electrolysation chamber (116) adjacent the bottom closed end (120) for receiving the fluid from the inlet (140). Preferably, the flushing outlet (210) extends downwardly from and is fluidly connected to the flow dispersion chamber (114). The flushing outlet may comprise a valve (212) for opening and closing the flushing outlet.

The inlet (140) is also preferably equipped with a controlling valve (142) for modulating the flow of fluid injected inside the reactor whereas the outlet (332) may be equipped with an outlet valve (336) for modulating the flow of fluid leaving the reactor.

The reactor assembly may further comprise a filtering module (604) fluidly connected to the outlet of the at least one electrolytic reactor for filtering the fluid once treated in the at least one electrolytic reactor. Preferably, the filtering module comprises activated carbon as filtering agent.

The inlets of the reactors (100-108) of the reactor assembly (500) are fluidly connected to a main distribution line (502) configured to be operatively connected to a pump (602) for simultaneously injecting the fluid in the reactors. Similarly, the outlets of the reactors (100) are operatively connected to a main evacuation line (504), preferably equipped with a main valve (506) fluidly connected, for instance, to a filtering module (604) as illustrated on FIG. 14. The flushing outlets (210) of each reactor can also be connected to a main flushing line (508). This parallel configuration of the reactors is particularly adapted for electrocoagualtion treatment of the fluid.

Figure 13:
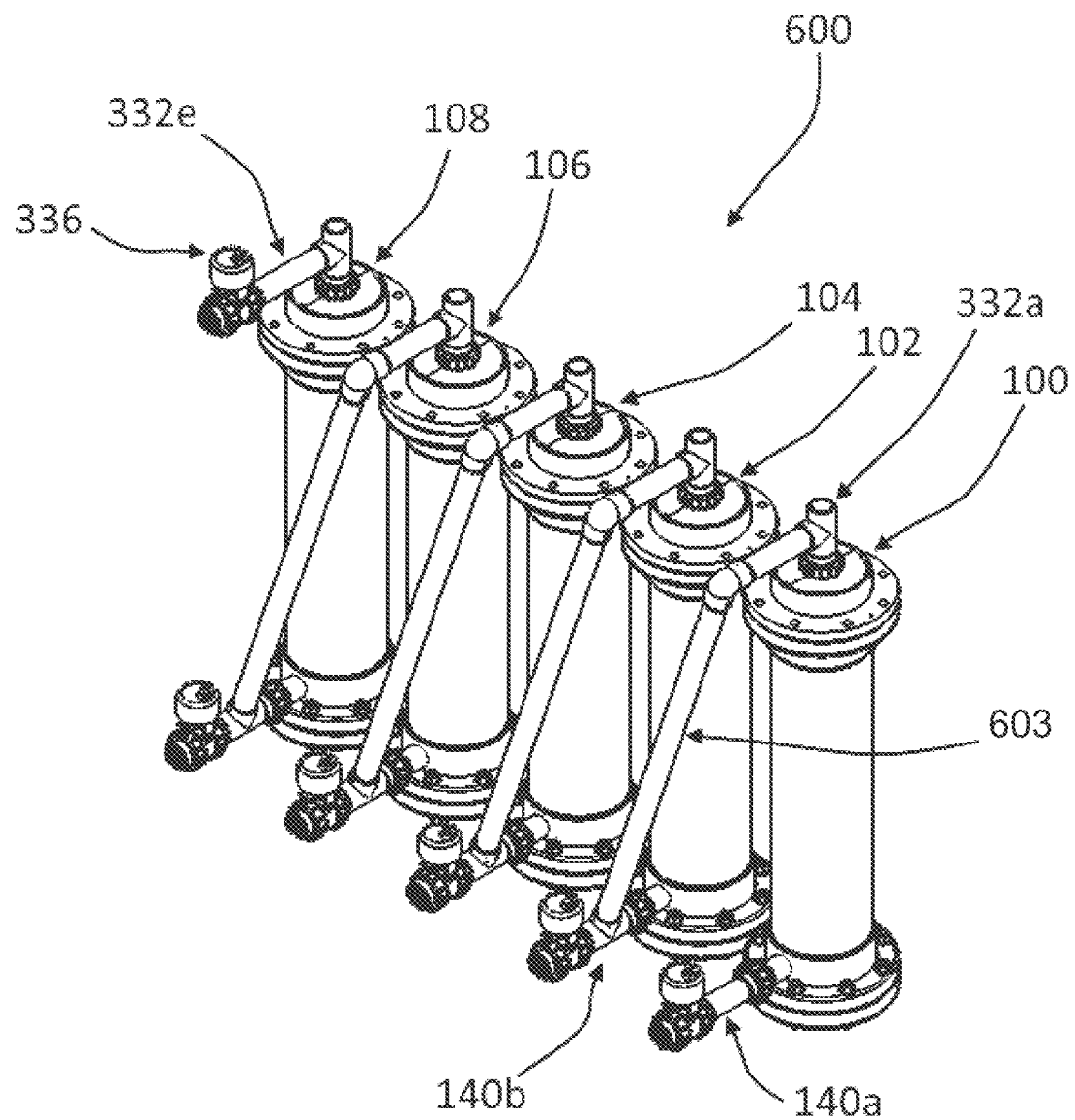
FIG. 13 shows a reactor assembly with five electrolytic reactors arranged in series, according to a preferred embodiment.

According to another preferred embodiment as shown on FIGS. 13 and 14, the reactor assembly (600) may comprise two or more of electrolytic reactors (100-108) fluidly connected in series, with the inlet (140a) of the first reactor (100) being fluidly connected to a pump (602), the outlet (332a) of the first reactor (100) being connected (603) to the inlet (140b) of the subsequent reactor (102), and finally the outlet (332e) of the last reactor (108) being fluidly connected, for instance, to a filtering module (604). The reactor assembly (600) my further comprise a concentrating module (606), located upstream the first reactor (100), for concentrating the pollutants in the fluid before being treated in the reactors, increasing as such the efficiency of the reactor assembly in the electrolytic treatment of the fluid. This configuration of the reactor assembly is particularly adapted for the electrooxidation treatment of the fluid.

As illustrated on FIG. 14, the reactor assembly (600) may further comprise a control panel (608) operatively connected to an electric power supply (610) for controlling the current density. The control panel (608) can control different elements of the reactor assembly, such as the pump (602), the valve (142), the filtering module (604), via connections (612) that can be wire connections or Wi-Fi or Bluetooth™ connections. The control panel (608) can be further remotely controlled via an application, for instance operated by a computer or a smart device (smartphone, tablet, etc.).

The reactor assemblies (500, 600) as disclosed therein, may further comprise a control module for modulating a flow rate of the fluid circulating in the at least one reactor and/or for controlling a retention time of the fluid inside the electrolytic chamber (110). Preferably, the control module comprises a modulating valve (142) operatively connected to the control panel (608) for modulating the flow rate and/or retention time.

According to another embodiment, the electrolytic reactor may further comprise at least one photovoltaic cell (not illustrated) which may be part of a solar module comprising multiple photovoltaic cells for electrically powering the reactor via solar energy. The electrolytic reactor can thus operate in a grid mode, wherein the reactor is powered by the electrical grid; a solar mode, wherein the reactor is powered by solar energy; or in a hybrid mode, wherein the reactor is powered by the electrical grid only when solar energy is not available.

Another aspect of the invention is a novel method for the assembly of an electrolytic reactor comprising a reactor body defining an electrolytic chamber having a closed end equipped with an inlet in fluid communication with the electrolytic chamber, and an open end opposite to the closed end. The method comprises providing an electrode cartridge comprising at least one anode and at least one cathode extending from a crown section comprising an outlet, and inserting the at least one anode and at least one cathode into the chamber through the open end, the crown section being configured to operatively seal the open end of the chamber. The outlet of the cartridge is in fluid communication with the electrolytic chamber when the reactor is assembled.

Another aspect of the invention is a novel method for the electrolytic treatment of a fluid. The method comprises providing an electrode cartridge comprising at least one anode and at least one cathode extending from a crown section, the crown section comprising an outlet. The cartridge is then inserted into an open end of the reactor body defining an electrolytic chamber having a closed end opposite to the open end, the closed end comprising an inlet. The open end of the chamber is then operatively sealed with the crown section of the cartridge, the outlet of the cartridge being in fluid communication with the electrolytic chamber when the cartridge is sealed to the chamber. The inlet is then fluidly connected to a pump for circulating the fluid in the reactor between the inlet and the outlet before electrically powering the at least one anode and at least one cathode while the fluid is circulating in the reactor to perform electrolysis of the fluid.

The electrolytic reactors as disclsoed herein are advantageous is that the outlet is extending upwardly above the electrodes, eliminating as such any dead zone typically found on electrodes at the level of the outlet with the useful surface area of the electrodes spanning the entire length of the chamber. This new configuration also increases the effective volume of the reactor. In addition, the outlet located above the electrodes eases the evacuation outside of the reactor of any gas produced during the electrolytic treatment of the fluid.

Also, the electrode cartridge is a quick-loading cartrtidge, easy to operate (plug and play), with improved sealing means (bolting mechanism).

The reactors as described herein are also more efficient in that they avoid dead zones and allow increasing surface area of cathode and tehrfore allow the reduction of energy consumption.

While illustrative and presently preferred embodiments of the invention have been described in detail hereinabove, it is to be understood that the inventive concepts may be otherwise variously embodied and employed and that the appended claims are intended to be construed to include such variations except insofar as limited by the prior art.

What is claimed is:

1. An electrolytic reactor for the electrolytic treatment of a fluid, the reactor comprising:
an electrolytic chamber having a bottom closed section, a top open section opposite to the bottom closed section, and a peripheral wall extending longitudinally from the bottom closed section to the top open section;
an electrode cartridge comprising an electrode assembly having at least one anode and at least one cathode longitudinally extending from a crown section, the electrode assembly being configured to be electrically connected to and powered by an electric power supply, wherein the crown section of the electrode cartridge is configured to operatively seal the top open section of the electrolytic chamber when the electrode assembly is inserted in the electrolytic chamber through the top open section thereof;
an inlet extending through the peripheral wall adjacent the bottom closed section and configured to be in fluid communication with the electrolytic chamber in order to inject the fluid to be treated therein, the inlet extending perpendicularly to a vertical longitudinal axis defined by the electrolytic chamber; and
an outlet extending through the crown section along the vertical longitudinal axis defined by the electrolytic chamber, the outlet being configured to be in fluid communication with the electrolytic chamber when the electrolytic chamber is sealed by the crown section of the electrode cartridge in order to extract the fluid flowing through the electrolytic chamber,
wherein the crown section comprises a compartment having a peripheral wall extending between a bottom wall and a top wall opposing the bottom wall, the top and bottom walls having the outlet upwardly extending therethrough, the compartment being configured in size to contain, at least in part, hardwares for mechanically supporting the electrode assembly and electrically connecting the same to the electric power supply,
wherein the outlet is aligned at a center of the top and bottom walls of the crown section and fluidly connected to the electrolytic chamber through the compartment, wherein the electrode assembly comprises:
a longitudinal central cathode aligned with the center of the top wall and outlet of the crown section; and
three semi-concentric longitudinal anodes connected to the crown section for surrounding an entire length of the central cathode, wherein the hardwares for electrically connecting the electrode assembly comprises:
a cathode connecting assembly having an L shape with a horizontal member operatively connected to and horizontally extending from a top section of the central cathode and a vertical member extending upwardly from the horizontal member through the bottom wall of the compartment and electrically connected to the power supply; and an anode connecting assembly comprising:
- for each of the three semi-concentric longitudinal anodes, a vertical connecting element operatively connected to and going through the bottom wall of the compartment; and
- a connecting loop supported inside the compartment by the bottom wall around the outlet for connecting together the three vertical connecting elements of the anodes, the connecting loop being electrically connected to the power supply, and wherein the connecting loop has a closed horseshoe form for leaving a space on the bottom wall for the vertical member of the cathode connecting assembly to go through the bottom wall while avoiding contact with the three vertical connecting elements of the anodes.

2. The electrolytic reactor of claim 1, wherein the bottom closed section comprises a bottom sealing system comprising:
- a bottom closing ring comprising the inlet and operatively connected to the bottom closed section of the electrolytic chamber;
- a closing disk configured to be secured to the bottom closing ring for sealing the chamber; and
- optionally, a bottom seal sandwiched between the bottom closing ring and the closing disk.

3. The electrolytic reactor of claim 2, wherein the bottom closing ring and the closing disk are secured together with a plurality of fasteners inserted into a plurality of matching holes disposed around a periphery of the closing ring and disk.

4. The electrolytic reactor of claim 1,
further comprising a top sealing system comprising:
- a top closing ring operatively connected to the top open section of the electrolytic chamber, the top closing ring being configured to be secured to a connecting ring outwardly extending from the bottom wall of the compartment of the crown section, for sealing the chamber; and
- optionally, a top seal sandwiched between the top closing ring of the top sealing system and the connecting ring of the crown section.

5. The electrolytic reactor of claim 1, further comprising a guiding mechanism so as to ensure proper insertion of the cartridge in the electrolytic chamber, and/or a latching mechanism associated with a clicking sound for alerting a user that the electrode cartridge has been properly inserted in the electrolytic chamber.

6. A reactor assembly for the treatment of a fluid, the reactor assembly comprising:
- at least one electrolytic reactor as claimed in claim 1;
- an electrical power supply operatively connected to the electrode assembly of each of the at least one reactor; and
- a pump fluidly connected to the inlet of the at least one electrolytic reactor for circulating the fluid inside the reactor assembly.

7. The reactor assembly of claim 6, further comprising a concentrating module fluidly connected to the inlet of the at least one electrolytic reactor for concentrating contaminants contained in the fluid before injecting the same in the at least one electrolytic reactor for treatment.

8. The reactor assembly of claim 7, further comprising a filtering module fluidly connected to the outlet of the at least one electrolytic reactor for filtering the fluid once treated in the at least one electrolytic reactor.

9. The reactor assembly according to claim 8, comprising two or more of said at least one electrolytic reactor, wherein:
- the reactors are fluidly connected in series, the inlet of a first reactor being fluidly connected to the pump and the concentrating module, and the outlet of a last reactor being fluidly connected to the filtering module; or
- the reactors are fluidly connected in parallel, the inlets of each of the two or more of said at least one electrolytic reactor being fluidly connected to the pump and the concentrating module, and the outlets of each of the two or more of said at least one electrolytic reactor being fluidly connected to the filtering module.

10. The reactor assembly according to claim 9, further comprising a control module for modulating a flow rate of the fluid circulating in the at least one reactor and/or for controlling a retention time of the fluid inside the electrolytic chamber, and wherein the control module comprises a modulating valve operatively connected to a control panel for modulating the flow rate and/or retention time.

11. The reactor assembly according to claim 10, wherein the control panel is also operatively connected to the electric power supply for controlling current density.

12. An electrolytic reactor for the electrolytic treatment of a fluid, the reactor comprising:
- an electrolytic chamber having a bottom closed section, a top open section opposite to the bottom closed section, and a peripheral wall extending longitudinally from the bottom closed section to the top open section;
- an electrode cartridge comprising an electrode assembly having at least one anode and at least one cathode longitudinally extending from a crown section, the electrode assembly being configured to be electrically connected to and powered by an electric power supply, wherein the crown section of the electrode cartridge is configured to operatively seal the top open section of the electrolytic chamber when the electrode assembly is inserted in the electrolytic chamber through the top open section thereof;
- an inlet extending through the peripheral wall adjacent the bottom closed section and configured to be in fluid communication with the electrolytic chamber in order to inject the fluid to be treated therein, the inlet extending perpendicularly to a vertical longitudinal axis defined by the electrolytic chamber; and
- an outlet extending through the crown section along the vertical longitudinal axis defined by the electrolytic chamber, the outlet being configured to be in fluid communication with the electrolytic chamber when the electrolytic chamber is sealed by the crown section of the electrode cartridge in order to extract the fluid flowing through the electrolytic chamber, wherein the crown section comprises a compartment having a peripheral wall extending between a bottom wall and a top wall opposing the bottom wall, the top and bottom walls having the outlet upwardly extending therethrough, the compartment being configured in size to contain, at least in part, hardwares for mechanically supporting the electrode assembly and electrically connecting the same to the electric power supply, wherein the outlet is aligned at a center of the top and bottom walls of the crown section and fluidly connected to the electrolytic chamber through the compartment, wherein the electrode assembly comprises a beam of 2N longitudinal rods forming the electrodes, with N being an integer number greater or equal to 3, the 2N longitudinal rods being secured to the bottom wall of the crown section and disposed in a cylindrical manner around the vertical axis going through the center of the outlet, the 2N electrodes comprising a first group of N electrodes operatively connected to a first current distribution circuit, and a second group of N electrodes operatively connected to a second current distribution circuit, wherein the N electrodes of the first group alternate with the N electrodes of the second group, wherein the first current distribution circuit comprises a first distribution plate, made of an electrical conductive material, supported by the bottom wall of the compartment and defining a first shape; and the second current distribution circuit comprises a second distribution plate, made of the electrical conductive material, supported by the bottom wall of the compartment and defining a second shape, and wherein the first plate has a ring shape extending transversely inside the compartment, whereas the second plate has a star shape configured in size to be located inside the first plate, the ring shape defining a number N of tips extending inwardly, each tip forming an electrical connecting point with one electrode of the same group, whereas the star shape defines a number N of tips extending outwardly toward the first plate, wherein the N tips of the second plate intercalate with the N tips of the first plate along a same circumferential position, the intercalated tips being each electrically connected with one electrode of its respective group.

13. The electrolytic reactor of claim 12, wherein the bottom closed section comprises a bottom sealing system comprising:
a bottom closing ring comprising the inlet and operatively connected to the bottom closed section of the electrolytic chamber;
a closing disk configured to be secured to the bottom closing ring for sealing the chamber; and
optionally, a bottom seal sandwiched between the bottom closing ring and the closing disk.

14. The electrolytic reactor of claim 12 further comprising a top sealing system comprising:
a top closing ring operatively connected to the top open section of the electrolytic chamber, the top closing ring being configured to be secured to a connecting ring outwardly extending from the bottom wall of the compartment of the crown section, for sealing the chamber; and
optionally, a top seal sandwiched between the top closing ring of the top sealing system and the connecting ring of the crown section.

15. The electrolytic reactor of claim 12, further comprising a guiding mechanism so as to ensure proper insertion of the cartridge in the electrolytic chamber, and/or a latching mechanism associated with a clicking sound for alerting a user that the electrode cartridge has been properly inserted in the electrolytic chamber.

16. A reactor assembly for the treatment of a fluid, the reactor assembly comprising:
at least one electrolytic reactor as claimed in claim 12;
an electrical power supply operatively connected to electrode assembly of each of the at least one reactor; and
a pump fluidly connected to the inlet of the at least one electrolytic reactor for circulating the fluid inside the reactor assembly.

17. The reactor assembly of claim 16, further comprising a concentrating module fluidly connected to the inlet of the at least one electrolytic reactor for concentrating contaminants contained in the fluid before injecting the same in the at least one electrolytic reactor for treatment.

18. The reactor assembly of claim 17, further comprising a filtering module fluidly connected to the outlet of the at least one electrolytic reactor for filtering the fluid once treated in the at least one electrolytic reactor.

19. The reactor assembly according to claim 18, comprising two or more of said at least one electrolytic reactor, wherein:
the reactors are fluidly connected in series, the inlet of a first reactor being fluidly connected to the pump and the concentrating module, and the outlet of a last reactor being fluidly connected to the filtering module; or
the reactors are fluidly connected in parallel, the inlets of each of the two or more of said at least one electrolytic reactor being fluidly connected to the pump and the concentrating module, and the outlets of each of the two or more of said at least one electrolytic reactor being fluidly connected to the filtering module.

20. The reactor assembly according to claim 19, further comprising a control module for modulating a flow rate of the fluid circulating in the at least one reactor and/or for controlling a retention time of the fluid inside the electrolytic chamber, and wherein the control module comprises a modulating valve operatively connected to a control panel for modulating the flow rate and/or retention time, and wherein the control panel is also operatively connected to the electric power supply for controlling current density.

* * * * *